United States Patent [19]

Ketcham

[11] Patent Number: 5,330,020

[45] Date of Patent: Jul. 19, 1994

[54] SELF-POWERED TOWING SERVOMECHANISM

[76] Inventor: George M. Ketcham, 350 Wilson Rd., Easton, Conn. 06612

[21] Appl. No.: 709,364

[22] Filed: Jun. 3, 1991

[51] Int. Cl.⁵ .............................................. B62D 53/04
[52] U.S. Cl. ................................. 180/14.2; 180/14.6
[58] Field of Search .................... 180/6.64, 11.0, 14.1, 180/14.2, 14.3, 14.6, 16; 280/476.1

[56] References Cited

U.S. PATENT DOCUMENTS

| | | | |
|---|---|---|---|
| 4,027,738 | 6/1977 | Lundin | 180/14.3 |
| 4,502,557 | 3/1985 | Anderson | 180/14.2 |
| 4,771,838 | 9/1988 | Ketcham | 180/14.2 X |

Primary Examiner—Brian L. Johnson
Assistant Examiner—Florian Zeender
Attorney, Agent, or Firm—Abelman Frayne & Schwab

[57] ABSTRACT

A wheeled tailer power unit includes a self-powered, self-contained towing servomechanism that permits selective towing and control of a trailing vehicle by a leading vehicle in the absence of a power transmitting and control umbilical between the leading vehicle and the trailer power unit, A controller included in the trailer power unit measures the relative displacement of the unit and the leading vehicle and communicates to a unit control and drive means appropriate signals to operate variable torque transmitting drive means operating the respective wheels of the trailer power unit.

8 Claims, 3 Drawing Sheets

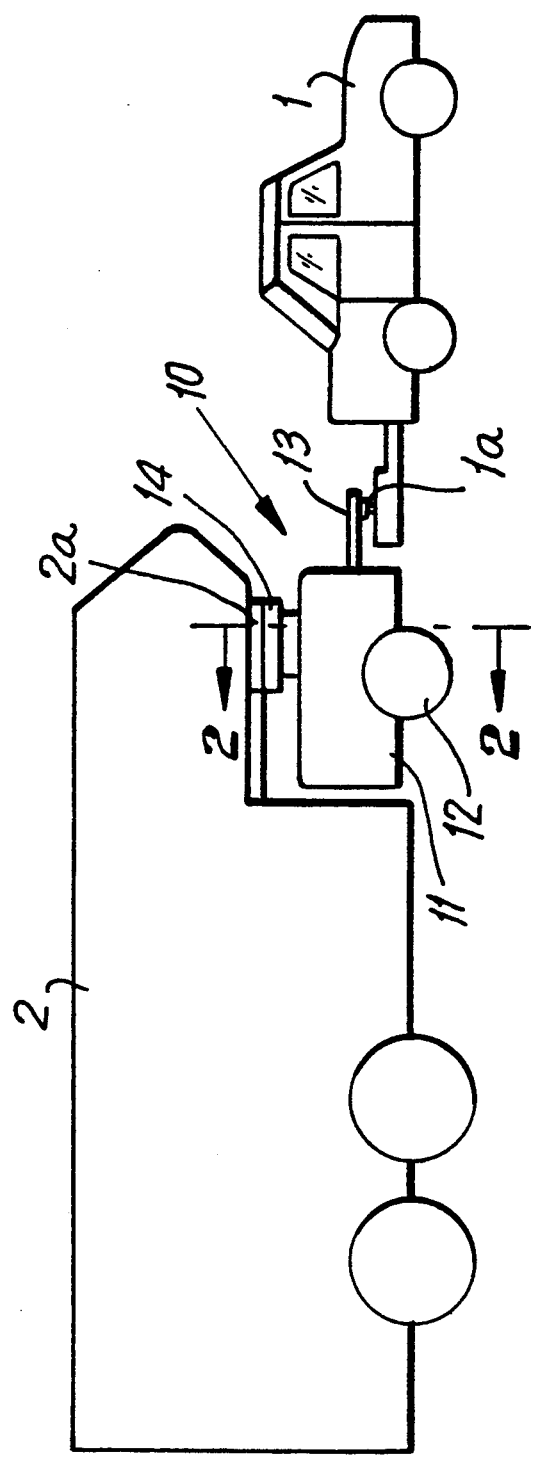
FIG. I

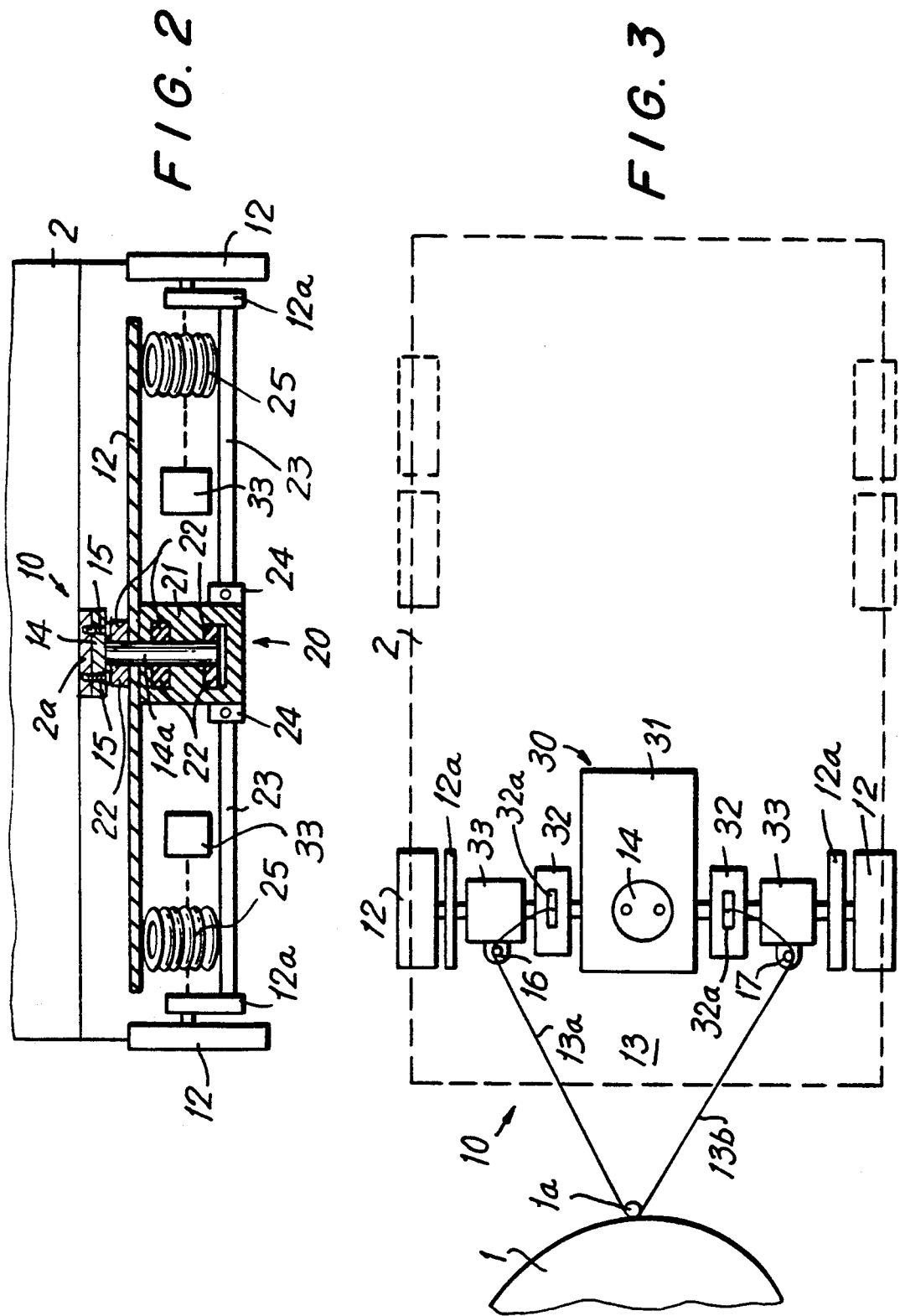

SELF-POWERED TOWING SERVOMECHANISM

BACKGROUND OF THE INVENTION

The present invention generally relates to servomechanisms. More specifically, the present invention relates to a self-powered and self-contained servomechanism for towing recreational vehicles, trailers, barges and the like.

A leading vehicle and a trailing vehicle interconnected in a manner permitting relative rotational movement while preventing relative linear displacement, such as the commonly-known tractor and trailer combination, operate as a single articulated vehicle. Each element of the combination is responsive to the forces and movements of the connected element as transferred through the articulative connection. A commonly-known disadvantage of such articulative connections is the problem of jackknifing, i.e. the failure of the leading vehicle to constrain the trailing vehicle.

Various attempts have been made within the art to effect control of one element of an articulated vehicle by another element of the combination. In U.S. Pat. No. 4,771,838 to the present Applicant a self-powered and self-controlling trailing vehicle is disclosed that operates in the absence of a power transmitting and control umbilical between a leading vehicle and the trailing vehicle. Thereby the responsiveness of the leading vehicle and the trailing vehicle are isolated from each other. The present invention discloses particular advantages over the trailing vehicle of the referenced U.S. patent including a greater variety of applications, better steering control of the trailing vehicle, and utilization of less power for control of the trailing vehicle.

In the trailing vehicle disclosed in the '838 patent, ground-engaging wheels are shown disposed at the rear of the trailing vehicle body. Thus, the trailing vehicle is susceptible to lateral movement at its forward end that must be corrected by the control means of the trailing vehicle. Such lateral movements may be caused by crosswinds, road protuberances and the like. As a result, the control means is required to do additional work beyond that required by active steering of the leading vehicle. Thus the control means is generally active even during straight line travel of the trailing vehicle which necessitates additional power requirements in the control means and contributes to fatigue in the control means. Furthermore, a trailing vehicle of the type disclosed in the '838 reference having the ground-engaging wheels disposed at the rear of the trailing vehicle is more difficult to steer since the point of rotation of the trailing vehicle is further displaced from the leading vehicle. And since the power and control means of the referenced trailing vehicle are constructed as an integral part of the trailing vehicle, applications of the invention of the '838 reference for towing is correspondingly limited to the particular trailing vehicle configuration, i.e., for example, a recreational vehicle so constructed cannot be used for towing machinery, equipment and the like generally carried on a flatbed trailer.

SUMMARY OF THE INVENTION

The present invention is a self-powered, self-contained towing servomechanism referred to in this disclosure as a trailer power unit. The trailer power unit is selectively attachable between a leading vehicle and a trailing vehicle to provide means for towing and controlling the trailing vehicle. The trailer power unit includes power generation means sufficient to move the unit and the trailing vehicle, and trailing vehicle drive and control means responsive to movements of the leading vehicle. Thus no power transmitting and control umbilical is required between the leading vehicle and the trailing vehicle thereby permitting the use of low-power vehicles to tow large loads.

A position indicating member disposed on the leading vehicle provides a reference point for the trailer power unit to measure relative displacement of the leading vehicle and the trailer power unit. Trailer power unit communicates with the position indicating member by means of a controller which provides operating signals for the trailer power unit drive and control means. The trailer power unit drive and control means comprises a differential velocity drive and control system which operably communicates with the propulsion means of the trailer power unit, for example ground-engaging wheels disposed on each side of the trailer power unit. Trailer power unit attaches to the trailing vehicle by means of a connector permitting rotational movement of the trailing vehicle relative to the leading vehicle.

An object of the present invention is to provide a self-contained towing servomechanism for driving and controlling a trailing vehicle in response to movements of a leading vehicle.

Another object of this invention is to provide a trailer power unit that can be adapted to a variety of towing applications.

It is also an object of the present invention to provide a trailer power unit that can be selectively detached from one trailing vehicle and re-attached to another trailing vehicle.

Another object of tile present invention is to provide a towing servomechanism providing greater steering control of a trailing vehicle than disclosed in the prior art.

It is a further object of this invention to provide a towing servomechanism having reduced control power requirements.

These and other objects and advantages of the present invention will be apparent to those skilled in the art from the following description of a preferred embodiment, claims and appended drawings.

BRIEF DESCRIPTION OF THE DRAWINGS

FIG. 1 is a pictorial depiction of the trailer power unit of the present invention.

FIG. 2 is a cross-sectional view taken along line 2—2 of FIG. 1 illustrating the suspension system of the trailer power unit.

FIG. 3 is a schematic diagram illustrating a first preferred embodiment of the drive means and control means of the trailer power unit of the present invention.

DESCRIPTION OF PREFERRED EMBODIMENTS

Figure 4:
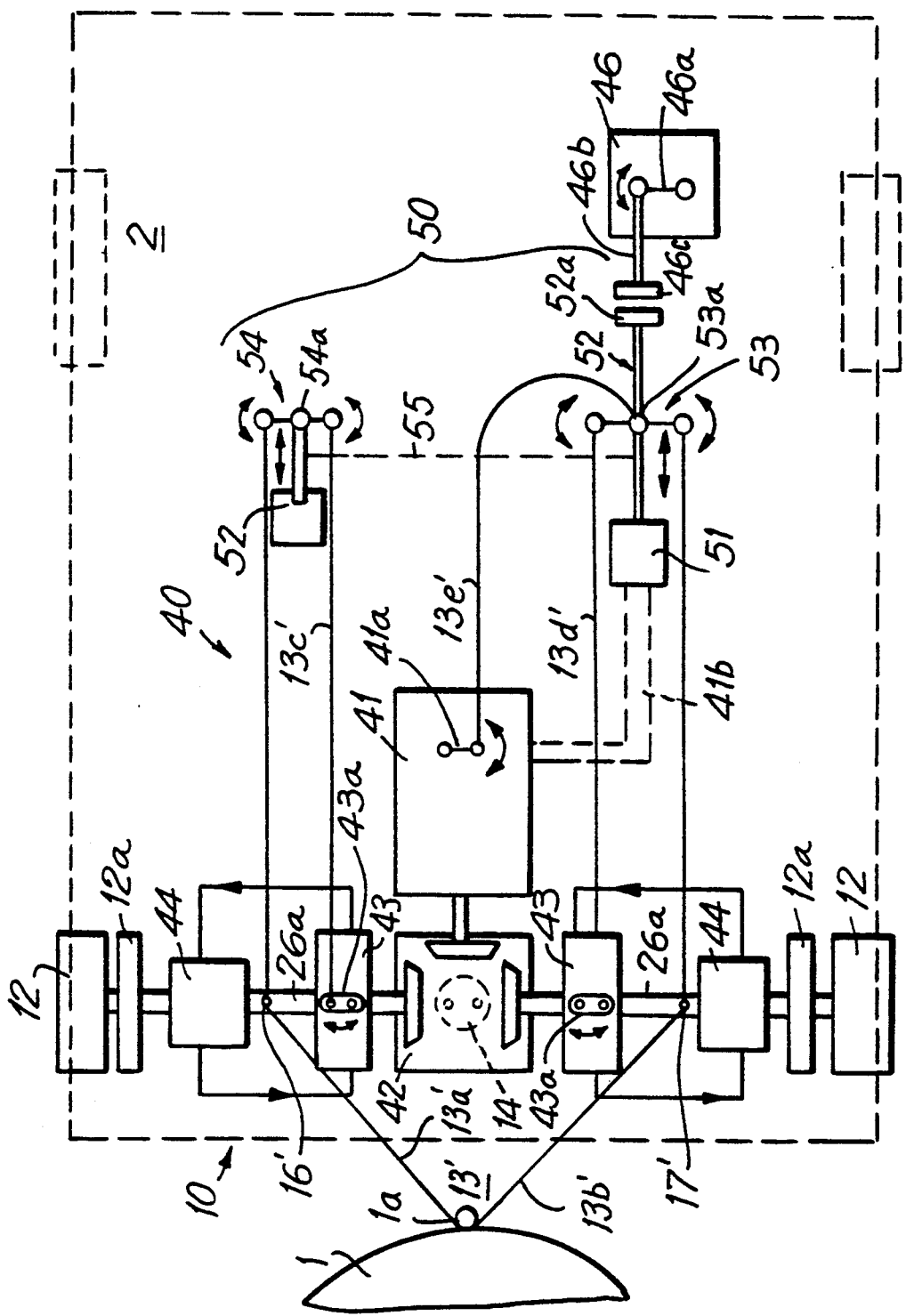
FIG. 4 is a schematic diagram illustrating a second preferred embodiment of drive means and control means of the present invention.

FIG. 1 illustrates in a pictorial schematic diagram the trailer power unit 10 of the present invention and its disposition relative to a leading vehicle 1 and a trailing vehicle 2. In a preferred embodiment trailer power unit 10 is a wheeled, self-powered, self-contained towing servomechanism selectively disposable between the leading vehicle 1 and the trailing vehicle 2. As a particular advantage of the present invention trailer power unit 10 permits the use of small vehicles for towing large vehicles. Thus, leading vehicle 1 is any moving object capable of providing a reference point 1a, such as a compact or sub-compact passenger automobile. Trailing vehicle 2 is illustrated in FIG. 1 as a commercial cargo trailer, but is should be understood by those skilled in the art that trailing vehicle 2 may be any vehicle that can be towed in a controllable manner.

Trailer power unit 10 includes a unit body 11 disposed on wheels 12 extending to each side of unit body 11. Trailer power unit 10 attaches by means of a controller 13 to a position indicating member 1a fixedly disposed on leading vehicle 1, and attaches to a trailing vehicle hitch 2a disposed on trailing vehicle 2 by means of a trailer power unit connector 14. Trailing vehicle drive and control means are housed within unit body 11 and communicates with wheels 12 and controller 13 as hereinafter described in greater detail. Controller 13 provides operating signals to the trailing vehicle drive and control means responsive to movements of the position indicating member 1a. Trailer power unit connector 14 provides means for secure and laterally rotatable attachment of the trailing vehicle 2 to the trailer power unit 10.

A particular advantage of the present invention is the provision of a self-powered, self-contained towing unit. Trailer power unit 10 can be easily detached from one leading vehicle 1 or trailing vehicle 2 and attached to another, readily providing controllable towing in a variety of configurations. Thus, for example, a single trailer power variety of configurations. Thus, for example, a single trailer power unit 10 can be utilized to move a plurality of trailers about a docking yard eliminating the need for tractor operators to spend time waiting to unload. Furthermore, since trailer power unit 10 is a servomechanism such cuing can be accomplished utilizing a low-power leading vehicle 1.

FIG. 2 is a cross-sectional view of the trailer power unit 10 taken along line 2—2 of FIG. 1 illustrating the suspension system 20 of the trailer power unit 10, the power generation means 31 being omitted for the sake of clarity. Trailer power unit 10 is attached to trailing vehicle 2 in a manner preventing vertical displacement of the trailer power unit connection 14 relative to the trailing vehicle hitch 2a of trailing vehicle 2, preferably by bolt means 15 extending through trailer power unit connector 14 and trailing vehicle hitch 2a. The up and down movement of a trailing vehicle 2 during towing operations is absorbed by the suspension system 20 of the trailer power unit 10. Trailer power unit connector 14 includes a connector stem 14a which extends into a central body 21 having thrust and radial bearings 22 disposed respectively below the trailer power unit connector 14 on the top of central body 21 and within central body 21 about connector stem 14a. Connector stem 14a is free to rotate within central body 21. Chassis frame members 23 extend from each side of the central body 21. The frame members 23 are pivotally connected to central body 21 by pivoting connectors 24 at one end and fixedly attached to wheel frames 12a at the opposing end. Wheels 12 are rotatably attached to wheel frames 12a. Springs 25 are fixedly attached between the unit body 11 and chassis frame members 23 proximate the wheel frames 12a. Thus, up and down movement of the trailing vehicle 2 is transferred to the central body 21 and by the pivoting action of chassis frame members 23 to springs 25 where these forces are absorbed.

FIG. 3 is a schematic illustration of a preferred embodiment of the trailing vehicle drive and control means 30 included in the unit body 11 of trailer power unit 10. A trailing vehicle drive and control means 30 communicates with controller 13 and operates on the principal of differential velocity drive on wheels 12. A controller 13 suitable for use with a trailing vehicle drive and control means 30 comprises a pair of push/pull cables 13a, 13b which interconnect the position indicating member 1a of leading vehicle 1 and respective velocity control levers 32a of the trailing vehicle drive and control means 30 via first and second fixed reference points 16 and 17 disposed on trailer power unit 10 as hereinafter described in greater detail.

The trailing vehicle drive and control means 30 includes a centrally-disposed power generation means 31, for example an internal combustion engine, which communicates with respective variable velocity transmitting means 32 controllable by levers 32a. The variable velocity transmitting means 32 control the driving velocity from power generation means 31 to the respective wheels 12 of trailer power unit 10 through respective wheel drive means 33. Power is differentially applied to wheels 12 in response to relative displacement of the position indicating member 1a and the first and second fixed reference points 16, 17 by operation of the control levers 32a as leading vehicle 1 moves relative to the trailing vehicle 2. The thrust force transferred to the trailer power unit connector 14a and thereby to the trailing vehicle 2 as a consequence of power being supplied to the wheels 12 is maintained in line with the direction of travel of position indicating member 1a, which is the direction of travel of leading vehicle 1 in the absence of skidding. Trailing vehicle 2 is thereby accelerated, de-accelerated, steered and stopped by operation of the variable velocity transmitting means 32 upon wheels 12. Variable velocity transmitting means 32, for example, may comprise a variable displacement hydraulic pump and hydraulic motors, or any other suitable means for continuously varying the rotational velocity of the wheels 12. In operation of first trailing vehicle drive and control means 30, in response to a lateral displacement of position indicating member 1a to the left, for example, which corresponds to a turning path of leading vehicle 1 to the left, cable 13a is caused to lengthen and cable 13b is caused to shorten, thereby moving the respective velocity control levers 32a in opposing directions to create unequal rotational velocity in the respective wheels 12a and thereby slow the left wheel 12 and speed up the right wheel, to turn the trailing vehicle 2 in the direction of motion of the position indicating member 1a, and that of the leading vehicle 1. When leading vehicle 1 proceeds straight forward, equal velocity is transmitted to the wheels 12 to maintain straight forward movement of trailing vehicle 2.

The placement of the ground-engaging wheels 12 in vertical alignment with trailer power unit connector 14 as shown in the trailer power unit 10 of the present invention prevents lateral displacement of the trailing vehicle 2 except in response to lateral movement of the leading vehicle 1. Therefore, perturbing forces caused by cross winds, surface irregularities and the like do not induce any lateral movement of the trailing vehicle 2. Thus operation of the first trailing vehicle drive and control means 30 is limited to active movement of leading vehicle 1 and wasteful utilization of control power is avoided.

FIG. 4 is a schematic illustration of a second preferred embodiment of the trailing vehicle drive and control means 40 included in the unit body 11 of the trailer power unit 10. Second trailing vehicle drive means and control means 40 includes a selectively controllable internal combustion engine 41 which operates through a gear box 42 to communicate with respective variable torque transmitting means 43, preferably hydraulic pumps, to power respective bi-directional hydraulic motors 44. Ground-engaging wheels 12 are attached to the respective hi-directional hydraulic motors 44 via wheel frames 12a. Second trailing vehicle drive and control means 40 further includes a supplemental braking system 46 operable by an engine control and brake actuator system generally shown as indicated by the numeral 50 and as hereinafter described in greater detail.

A second controller 13' communicates with a position indicating member 1a disposed on leading vehicle 1. Second controller 13' comprises a pair of push/pull cables 13a', 13b' interconnecting the position indicating member 1a and the engine control and brake actuator system 50. Engine control and brake actuator system 50 in turn communicates with torque control levers 43a of the respective variable torque transmitting means 43 and an engine control throttle 41a on the engine 41.

Engine control and brake actuator system 50 is a vacuum servomechanism which operates in response to a vacuum or partial vacuum created in the intake manifold 41b of the internal combustion engine 41 serving as the power generation means for the trailer power unit 10. Engine control and brake actuator system 50 includes a linear displacement element 51 interconnecting the intake manifold 41b and a rigid engine control and brake actuator link 52. Engine control and brake actuator link 52 is formed having an actuator bearing pad 52a disposed at the distal end thereof. Linear displacement element 51 is any type of structure or mechanism, for example a diaphragm, responsive by linear movement to the presence of a vacuum in the intake manifold 41b. Supplemental braking system 46 includes a brake control lever 46a having a rigid brake response link 46b formed with a response link bearing pad 46c disposed at the distal end thereof. Response link bearing pad 46c is disposed in displaced face-to-face relationship with actuator link bearing pad 52a for selective operation of supplemental braking system 46 as hereinafter described. First and second engine control levers 53, 54 are pivotally attached to the engine control and brake actuator link 52 about respective pivot points 53a, 54a and interconnect the position indicating member 1a and the respective toque control levers 43a of the variable torque transmitting means 43. In FIG. 4 the first and second engine control levers 53, 54 are shown disposed to each side of the trailer power unit 10 and interconnected by a dashed line 55 for clarity of illustration, but there is only a single engine control and brake actuator link 52 to which the respective engine control levers 53, 54 are pivotally attached in displaced relationship. Controller cables 13a' and 13b' are attached to one end of the respective engine control levers 53, 54 via respective fixed reference points 16' and 17' disposed on the trailer power unit 10. Respective second push/pull cables 13c' 13d' interconnect the opposite end of the respective engine control levers 53, 54 and the pump control levers 43a of the respective variable torque transmitting means 43. A third push/pull cable 13e' responsive to linear movement of the brake actuator link 52 extends from the engine control and brake actuator link 52 to the engine throttle control 41a.

Second trailing vehicle drive and control means 40 operates substantially as described for first trailing vehicle drive and control means 30. In response to lateral movement of the position indicating member 1a the controller cables 13a' and 13b' are respectively shortened and lengthened to rotate the respective engine control levers 53, 54. Rotation of engine control levers 53, 54 operate the pump control levers 43a for differential torquing of the hi-directional motors 44 and wheels 12. In addition, the supplemental braking system 46 is activated in response to linear movement of the actuator link bearing pad 52a against response link bearing pad 46a to cause rotation of brake control lever 46a.

As previously noted, engine control and brake actuator system 50 responds to vacuums in the engine intake manifold 41b. High vacuum, indicating low engine power requirements, cause linear displacement element 51 to move toward intake manifold 41a and thereby move engine control and brake actuator link 52 in the same direction which in turn moves engine throttle control 41a toward its idle position by operation of third cable 13e' and also adds to the movement of controller cables 13a' and 13b' and therefore to the movements of pump control levers 43a. Thus for declining power, engine throttle control 41a moves toward engine idle allowing engine speed to drop while pump control levers 43a are advanced to compensate for lower engine speed. Low vacuum, indicating high engine power requirements, cause linear displacement element 51 to move away from intake manifold 41a and thereby move engine control and brake actuator link 52 in the same direction to move engine throttle control 41a to cause an increase in fuel flow to engine 41 in response to the increased power demands and also to subtract from the movement of controller cables 13a' and 13b' and therefore to the movement of pump control levers 43a. Thus for increasing power, engine throttle control 41a advances causing engine speed to increase while pump control levers 43a are retracted to compensate for increasing engine speed. When engine 41 is operating at or near the engine idle speed (depending upon design parameters) and engine throttle control 41a is disposed in its minimum fuel flow position, i.e. its idle position, supplemental braking system 46 is activated in response to increasing manifold vacuum if the speed of engine 41 increases above its idle speed. Engine throttle control 41a remains in its idle position during the decelerating momentum of the trailer power unit 10 and the trailing vehicle 2. Thus, supplemental braking system 46 acts in a manner similar to an engine governor to prevent revving of engine 41 and facilitate slowing of trailer power unit 10.

Variations in the performance of engine 41 are automatically compensated for by means of the closed, negative feedback loop 13' of second drive and control means 40. Thus, engine 41 can be independently controlled responsive to the performance required of it to provide maximum power, efficiency or other desirable.

Various changes, modifications and additions may be made to the preferred embodiments of the present invention without departing from its spirit and scope. For example, the ground-engaging wheels 12 may be replaced with hydro-propulsion means for use of the trailer power unit 10 to tow barges, boats or other water vehicles. Such changes, modifications and additions within a fair reading of the following claims are intended as part of the present disclosure.

Therefore, in view of the foregoing, I claim:

1. An obedient self-powered and self-controlling slave vehicle for interposition between a leading master vehicle and a towed trailer unit; said slave vehicle having a body and independent suspension means for two independently driven ground engaging wheels, said ground engaging wheels each having an axis of rotation lying in a vertical plane common to both axes and which extends transversely of said slave vehicle;

individual suspension means for said respective ground-engaging wheels permitting oscillations of said respective axes of said respective ground wheels in said substantially vertical plane to the substantial exclusion of movements of said axes of said respective ground wheels in any other direction;

a power supply mounted on said slave vehicle;

controllable variable torque transmitting means interposed in independent drive means from said power supply to said respective ground engaging wheels;

control means carried by said slave vehicle and controlling said variable torque transmitting means, said control means being operatively associated with actuator means and attached to said master vehicle by attachment means and actuated by said actuator means for it to follow the omnidirectional movement of said actuator means, and thus movements of said actuator means relative to a reference point on said slave vehicle, to provide selective steering, acceleration and braking of said slave vehicle duplicating movements of said master vehicle in the absence of a mechanical interconnection between said vehicles; and pivot means affixed to said slave vehicle body, said pivot means including first and second members providing for relative rotation between said members, one of said members being rigidly and immovably affixed to said slave vehicle body, the other of said members being rigidly attachable to said towed trailer at a leading end of said trailer, said trailer having ground engaging wheels at a trailing end of said trailer, said first and second members being rotatable relative to each other about an axis intersecting a centroid of said respective axes of rotation of said respective ground engaging wheels of said slave vehicle.

2. The obedient, self-powered and self-controlling slave vehicle of claim 1, in which one of said first and second members of said pivot means is detachably affixed to said towed trailer, thus permitting detachment of said slave vehicle from said towed trailer and subsequent connection of said slave vehicle to another said towed trailer.

3. The obedient, self-powered and self-controlling slave vehicle of claim 1, in which the axis of rotation of said first and second members of said pivot means is a vertical axis intersecting said centroid of said respective axes of rotation of said respective ground engaging wheels of said slave vehicle.

4. An obedient self-powered and self-controlling slave vehicle according to claim 1, further including means to provide controllable differential, reversible thrust to said ground-engaging wheels for selective and respective acceleration, deceleration, steering and stopping of said trailer power unit, said thrust providing means being responsive to movement of a controller communicating with a position indicating member disposed on said leading master vehicle, said thrust providing means including an internal combustion engine controllable by an engine throttle control and communicating through a gear body with respective variable torque transmitting means, and said variable torque transmitting means controlling output from said internal combustion engine and communicating in a closed, negative feedback loop with respective bi-directional hydraulic motors, said hydraulic motors providing thrust to said ground-engaging wheels;

a controller comprising a pair of push/pull cables interconnecting via respective fixed reference points on said trailer power unit the position indicating member disposed on said leading master vehicle and respective torque control levers disposed on respective controllable variable torque transmitting means;

an engine control and brake actuator system interconnecting between said controller and said torque control levers, said engine control and brake actuator system being a vacuum servomechanism operable in response to vacuums produced in an intake manifold of said internal combustion engine, said engine control and brake actuator system comprising a linear displacement element interconnecting the intake manifold and a rigid brake actuator link having an actuator link bearing pad disposed at an end thereof, said engine control and brake actuator system including a push/pull cable interconnecting said engine throttle control and said brake actuator link; and a supplemental braking system operably communicating with said engine control and brake actuator system, said supplemental braking system including a brake control lever attached to a rigid response link having a response link bearing pad disposed at an end thereof, said response link bearing pad and said actuator link bearing pad being disposed in displaced face-to-face relationship for selective operation of said braking system in response to linear movement of said linear displacement element, first and second engine control levers being pivotally attached to said brake actuator link and interconnecting the position indicating member and the respective torque control levers.

5. An obedient, self-powered and self-controlling slave vehicle according to claim 1, wherein said attachment means comprises a trailer power unit connector including a connector stem which extends into a central body, and said suspension means comprises said central body, and thrust and radial bearings disposed below the trailer power unit connector on the top of said central body and within said central body about said connector stem, said connector stem being free to rotate laterally with said central body, chassis frame members extending from each side of said central body, said frame members being pivotally connected to said central body at one end and fixedly attached to wheel frames at the opposite end, springs being fixedly attached between the unit body and said frame members proximate to said wheel frames.

6. An obedient, self-powered and self-controlling slave vehicle according to claim 1, further including an engine control and brake actuator system interconnecting said control means and a torque control of said variable torque transmitting means, said engine control means and brake actuator system being a vacuum servo-mechanism operable in response to vacuums produced in an intake manifold of an internal combustion engine comprising said power supply, and a supplemental braking system operably communicating with said engine control and brake actuator means.

7. An obedient, self-powered and self-controlling slave vehicle according to claim 6, wherein said engine control and brake actuator system comprises a linear displacement element interconnecting the intake manifold and a rigid engine control and brake actuator link having an actuator link bearing pad disposed at an end thereof, and said supplemental braking system includes a brake control lever attached to a rigid brake response link having a response link bearing pad disposed at an end thereof, said response link bearing pad and said actuator link bearing pad being disposed in displaced face-to-face relationship for selective operation of said braking system in response to linear movement of said linear displacement element, first and second engine control levers being pivotally attached to said engine control and brake actuator link and interconnecting the position indicating member and the respective torque control levers.

8. An obedient, self-powered and self-containing slave vehicle according to claim 7. wherein said engine is controllable by an engine throttle control and said engine control and brke actuator system includes a push/pull cable interconnecting said engine throttle control and said brake actuator link.

* * * * *